C. M. McCORMICK.
HARVESTER.
APPLICATION FILED JULY 10, 1908.

913,421.

Patented Feb. 23, 1909.
2 SHEETS—SHEET 1.

WITNESSES
E. G. Bromley
John K. Blackwood

INVENTOR
Charles M. McCormick
BY
ATTORNEYS

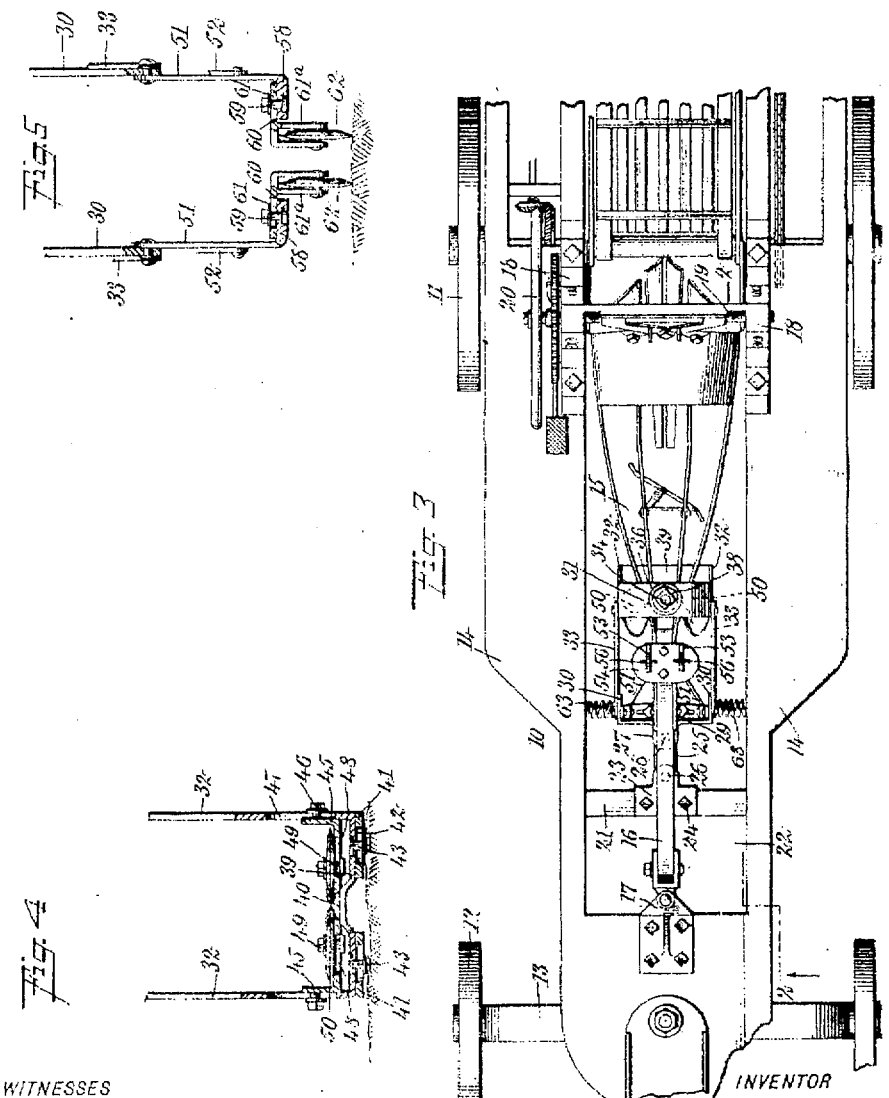

UNITED STATES PATENT OFFICE.

CHARLES M. McCORMICK, OF LA JUNTA, COLORADO.

HARVESTER.

No. 913,421.  Specification of Letters Patent.  Patented Feb. 23, 1909.

Application filed July 10, 1908. Serial No. 442,833.

*To all whom it may concern:*

Be it known that I, CHARLES M. McCORMICK, a citizen of the United States, and a resident of La Junta, in the county of Otero and State of Colorado, have invented a new and Improved Harvester, of which the following is a full, clear, and exact description.

This invention relates to harvesters, and more particularly to machines for harvesting crops such as sugar beets and the like.

Specifically, the invention relates to a beet harvester having a topper for removing the tops or leaves of the beets, and including means for severing the leaves which lie upon the ground as well as the standing beet tops from the roots.

An object of the invention is to provide a harvester for beets and the like, which includes a simple and efficient topper for removing the tops and leaves from the roots before the latter are taken from the soil by the plow or other means provided for the purpose.

A further object of the invention is to provide a harvester having a topper which can be adjusted for different kinds of vegetation, and to operate in fields cultivated in various ways and in which the roots or tubers are at different depths.

A still further object of the invention is to provide a harvester having a topper for removing the tops or leaves from beets and the like, which is resiliently, though firmly supported, so that it will automatically adjust itself to allow for irregularities of the ground.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1:
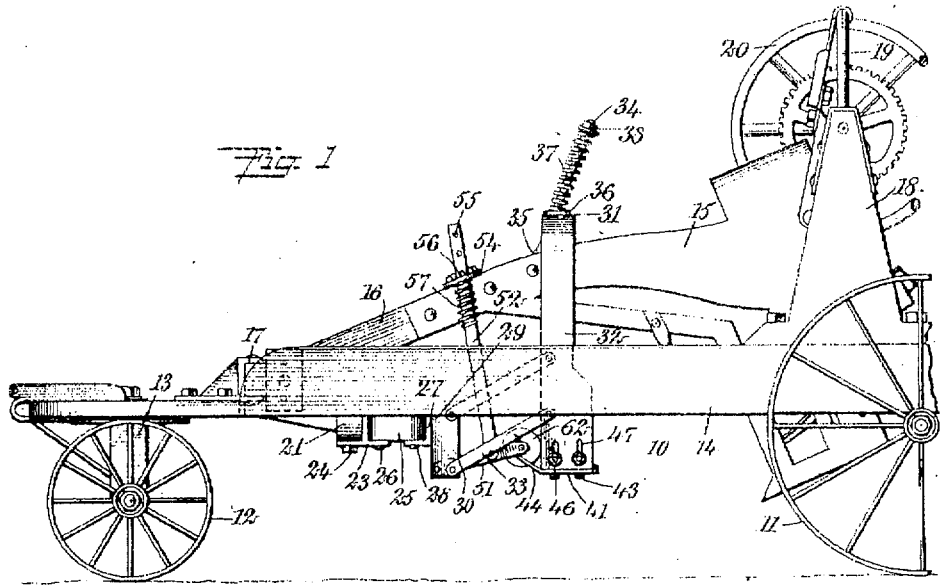
Figure 2:
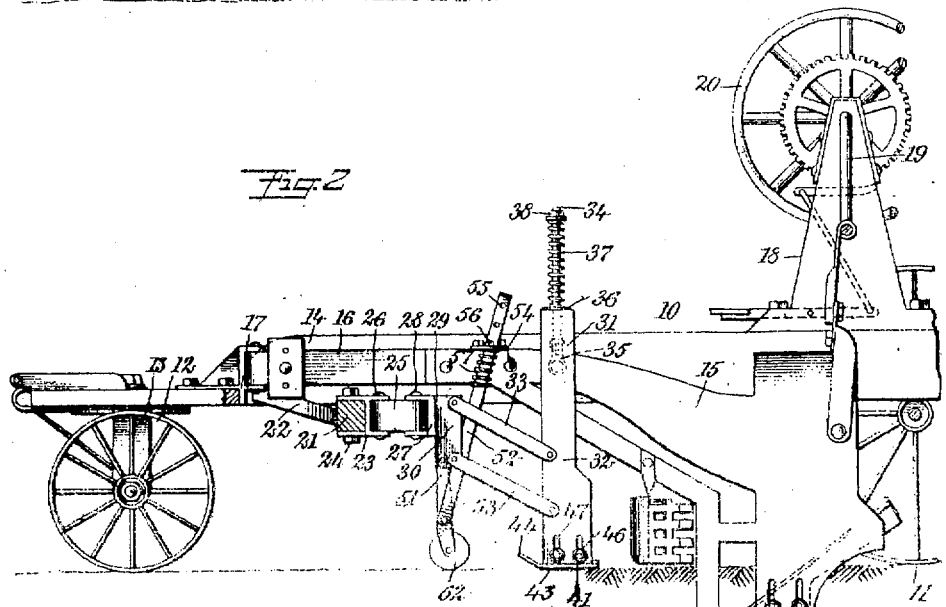

Figure 1 is a side elevation showing one embodiment of my invention; Fig. 2 is a longitudinal section taken on the line 2—2 of Fig. 3, and showing parts in operative position; Fig. 3 is a plan view showing parts broken away; Fig. 4 is an enlarged transverse section showing a part of the topper mechanism; and Fig. 5 is a similar view showing another part of the topper mechanism.

Before proceeding to a more detailed explanation of my invention, it should be clearly understood that while the same is particularly useful in connection with machines for harvesting sugar beets, it can also be advantageously applied to other forms of harvesters which employ suitable toppers for removing the tops or leaves from beets and other roots or tubers. The topper of my invention includes means for severing the tops from the roots, and at the same time means for severing any portions of the tops which are in a depressed position, or which lie upon the ground. The parts of the topper are adjustable, so that the device can be regulated to sever the tops properly from roots which project more or less above the ground. Furthermore, the topper parts are so resiliently though firmly supported, that the mechanism will adjust itself automatically to irregularities of the ground, and to furrows and the like, in traveling over a field.

Referring more particularly to the drawings, 10 represents the havester frame, which may be of any common or preferred form, and is supported upon wheels 11 and 12. The latter constitute the steering wheels, and have the axle 13 pivotally supporting the forward part of the harvester frame. The frame 10 has longitudinal side members 14 which are spaced, and between which is located the plow 15 by means of which the beets or other roots are dug up. The plow has the beam 16 pivotally secured to a suitable bracket 17, positioned at the front of the frame 10, and has the opposite end located between uprights 18, upon which it is pivotally supported by means of a hanger 19. A hand wheel 20 serves for the raising or lowering of the plow, as necessary.

A cross frame 21 is located near the forward part of the frame 10 and at the under side thereof. It is rigidly secured in place, and preferably has strengthening braces 22. A double U-bracket 23 is secured to the block 21 by means of bolts 24 or the like, and has a draw bar 25 secured thereto by means of a bolt pin 26 which permits the draw bar to swing in a substantially horizontal plane. At the opposite end, the draw bar carries a pivoted bracket 27 secured thereto by means of a pivot pin 28. A bifurcated member 29 is rigid with the bracket 27 and has side flanges 30 which are laterally and rearwardly disposed.

An inverted U-shaped hanger 31 straddles the plow and has its sides 32 secured to the side flanges 30 by means of pairs of links 33. A stem 34 passes through a suitable opening in the top of the hanger 31 and is movably fastened between the sides of the plow by means of a pivoted bracket 35. A washer 36 is arranged upon the stem 34 and rests upon the top of the hanger. A helical spring 37 is carried by the stem and is located between the hanger 36 and a nut 38 mounted upon a suitably threaded end of the stem. The spring 37 tends normally to force the hanger downward for a purpose which will appear more clearly hereinafter.

Between the sides of the hanger, at the lower ends thereof, is secured a base plate 39 having the central portion 40 upwardly disposed. The base plate is bifurcated at the upwardly disposed part 40, and at the bottom at each side has adjustable runners 41 which are adapted to slide along the ground and to receive the tops of the roots therebetween. The runners have slots 42 which receive bolts 43 carried by the base plate, and which serve adjustably to hold the runners in position. The forward ends or toes 44 of the runners are preferably upwardly disposed.

Cutter carriers 45 are arranged above the base plate at each side of the same and have bolts 46 which are received by slots 47 in the sides of the hanger, and which permit the cutter carriers to be arranged in a plurality of positions. Each of the carriers has a slot 48 which receives a bolt 49 carrying a circular cutter 50, so that the latter can be held in a plurality of positions. It will be understood that in this way the distance between the circular cutters can be varied as necessary, and the cutter carriers can be raised or lowered correspondingly to raise or lower the cutters. Furthermore, the runners can be adjusted laterally with respect to each other to vary the distances between the same. If so desired, washers or shims can be placed between the runners and the bottom of the base plate.

Cutter arms 51 are pivotally secured at the lower ends of the side flanges 30 and controlled by pivoted bars 52. The latter pass through slots 53 of a plate 54 mounted upon the plow beam 16. The bars have openings 55 therethrough which are adapted to receive pins 56 to hold the bars in a plurality of positions. Springs 57 are arranged upon the bars and abut against the under side of the plate 54. The springs are secured to the bars and tend normally to depress the same. The cutter arms 51 have the lower ends 58 laterally and inwardly disposed. Each of the ends carries a bolt 59 by means of which a bracket 60 which has a slot 61 to receive the bolt, is secured to a cutter arm. The brackets 60 have downwardly disposed bifurcations 61ª, between which are rotatably mounted circular cutters 62. The latter are arranged in substantially vertical position and are adapted to travel along the ground to sever any leaves or vegetation lying upon the same. As the brackets 60 are adjustable, the distance between the cutters 62 can be varied as necessary. Helical springs 63 are arranged between the side frame members 14 and the side flanges of the member 29, and serve resiliently to center and support the topper. The springs 37 tend to hold the runners in engagement with the ground as the harvester travels along, and the springs 57 perform a similar function for the rotatable or rolling cutters 62.

As the harvester moves along a row of sugar beets or the like, the cutters 62 pass at each side of the beet tops and sever any leaves or portions of the vegetation which lie upon the ground. The tops are received between the runners 41, and the cutter 50 severs the tops. These cutters are suitably adjusted and positioned for this purpose. The plow subsequently digs up and removes the roots from which the tops have already been severed. It will be understood that the topper is controlled by the plow, which can be raised or lowered as desired, but in the raised or inoperative position the plow holds the topper in a similar raised, inoperative position.

Having thus described my invention, I claim as new and desire to secure by Letters Patent:

1. In a harvester of the class described, a frame arranged to travel upon the ground, a plow pivotally mounted upon said frame and adapted to be raised or lowered, means for holding said plow in a plurality of positions, and a topper flexibly connected with said frame and controlled by said plow, said topper being arranged to swing in a plurality of directions.

2. In a harvester of the class described, a frame adapted to travel upon the ground, a plow pivotally carried by said frame and adapted to be raised or lowered, means for holding said plow in a plurality of positions, a topper secured to said frame and arranged to swing in a plurality of directions, means operatively connecting said plow and said topper, whereby said topper is raised or lowered as said plow is raised or lowered, and means for resiliently holding said topper in position.

3. In a harvester of the class described, a topper having a pair of rotatable cutters arranged to travel upon the ground, and at angles with the horizontal, a pair of cutters arranged substantially at right angles with said first pair, and means for resiliently holding all said cutters in position.

4. In a harvester of the class described, a topper arranged to swing in a plurality of directions, means for resiliently supporting said topper, and means for operatively connecting said topper to a part of the harvesting mechanism, whereby said topper is controlled by the harvesting mechanism.

5. In a harvester of the class described, a topper having spaced runners adapted to travel upon the ground and to receive plant tops therebetween, cutters adjustably arranged above said runners, and means for normally holding said runners in engagement with the ground.

6. In a harvester of the class described, a frame adapted to travel upon the ground, a member pivotally carried by said frame, rotatable cutters supported by said member and adapted to travel upon the ground, means for resiliently holding said cutters in engagement with the ground, runners adapted to travel upon the ground and to receive plant tops therebetween, fixed cutters arranged above said runners, and means for normally holding said runners in engagement with the ground.

7. In a harvester of the class described, a pair of cutters arranged to travel upon the ground at each side of a row of plants, spaced runners arranged behind said cutters and adapted to receive the plant tops therebetween, fixed cutters adjustably positioned above said runners and adapted to sever the plant tops, and means for flexibly supporting said first cutters and said runners.

8. In a harvester of the class described, a frame adapted to travel upon the ground, a member movably supported by said frame, cutter arms pivoted upon said member and each having a rotatable cutter adapted to travel upon the ground, bars controlling said cutter arms, means for holding said bars in a plurality of positions, a hanger spaced from said member, means for resiliently holding said hanger in position, runners carried by said hanger, fixed cutters arranged above said runners, and means for operatively connecting said member and said hanger.

9. In a harvester of the class described, a frame adapted to travel upon the ground, a member supported by said frame and arranged to swing in a plurality of directions, cutter arms pivoted upon said members and each having a rotatable cutter adapted to travel upon the ground, bars attached to said arms and controlling the same, means for holding said bars in a plurality of positions, resilient means for normally forcing said bars downward to hold said cutters in engagement with the ground, a hanger adjustably arranged adjacent to said member, resilient means for normally holding said hanger in position, spaced runners carried by said hanger at the lower end thereof, fixed cutters arranged above said runners and adapted to be adjusted with respect to one another, and means for operatively connecting said member and said hanger.

10. In a harvester of the class described, a frame adapted to travel upon the ground and having a plow pivotally carried thereby, a member pivotally supported by said frame and arranged to swing in a plurality of directions, cutter arms pivoted upon said member and each having a rotatable cutter adapted to travel upon the ground, a plate carried by said plow and provided with slots, bars secured respectively to said arms and projecting through said slots of said plate, springs secured to said bars and engaging said plate, means for holding said bars in a plurality of positions with respect to said plate, an inverted U-shaped hanger straddling said plow and having a base plate at the lower end thereof, runners adjustably secured to said base plate, fixed cutters adjustably carried by said hanger above said runners, means for resiliently supporting said hanger upon said plow, and links operatively and pivotally connecting said member and said hanger.

In testimony whereof I have signed my name to this specification in the presence of two subscribing witnesses.

CHAS. M. McCORMICK.

Witnesses:
J. B. PEARCE,
JESSIE P. CAIN.